US009253646B2

(12) United States Patent
Kim et al.

(10) Patent No.: US 9,253,646 B2
(45) Date of Patent: *Feb. 2, 2016

(54) METHOD AND APPARATUS FOR DYNAMIC STATION ENABLEMENT PROCEDURE IN A WIRELESS LOCAL AREA NETWORK SYSTEM

(75) Inventors: Eunsun Kim, Gyeonggi-do (KR); Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 118 days.

This patent is subject to a terminal disclaimer.

(21) Appl. No.: 13/030,654

(22) Filed: Feb. 18, 2011

(65) Prior Publication Data

US 2011/0286405 A1 Nov. 24, 2011

Related U.S. Application Data

(60) Provisional application No. 61/346,017, filed on May 18, 2010, provisional application No. 61/358,405, filed on Jun. 24, 2010, provisional application No. 61/351,945, filed on Jun. 7, 2010.

(51) Int. Cl.
*H04W 4/00* (2009.01)
*H04W 16/14* (2009.01)
*H04W 24/02* (2009.01)
*H04W 4/02* (2009.01)
*H04W 84/12* (2009.01)

(52) U.S. Cl.
CPC .............. *H04W 16/14* (2013.01); *H04W 24/02* (2013.01); *H04W 4/02* (2013.01); *H04W 84/12* (2013.01)

(58) Field of Classification Search
USPC ........................................ 370/329
See application file for complete search history.

(56) References Cited

U.S. PATENT DOCUMENTS

| 5,276,908 A | 1/1994 | Koohgoli et al. |
| 5,774,805 A | 6/1998 | Zicker |
| 6,175,739 B1 | 1/2001 | Ishii et al. |

(Continued)

FOREIGN PATENT DOCUMENTS

| CN | 1221542 A | 6/1999 |
| CN | 1561647 | 1/2005 |

(Continued)

OTHER PUBLICATIONS

Office Action issued in U.S. Appl. No. 12/993,409 mailed Jul. 3, 2012.

(Continued)

*Primary Examiner* — Yemane Mesfin
*Assistant Examiner* — Jeff Banthrongsack
(74) *Attorney, Agent, or Firm* — Morgan, Lewis & Bockius LLP

(57) ABSTRACT

A method of dynamic station enablement procedure in a wireless local area network (WLAN) is disclosed. A method of performing an enablement procedure by a first station in a regulatory domain where a licensed device and an unlicensed device are permitted to operate together in a wireless local area network (WLAN) comprises receiving, from a second station, an enabling signal including advertisement protocol element with an advertisement protocol identification (ID) field which indicates an advertisement protocol the second station supports; and exchanging DSE (dynamic station enablement) related messages with the second station using a GAS (generic advertisement service) protocol.

6 Claims, 11 Drawing Sheets

(56) References Cited

U.S. PATENT DOCUMENTS

| | | |
|---|---|---|
| 6,757,550 B1 | 6/2004 | Yoneyama et al. |
| 6,826,400 B1 | 11/2004 | Cashman et al. |
| 6,882,841 B1 | 4/2005 | Youn |
| 7,280,834 B2 | 10/2007 | Takarabe |
| 7,742,764 B2 | 6/2010 | Gillig et al. |
| 7,917,110 B2 | 3/2011 | Horiguchi et al. |
| 8,032,086 B2 | 10/2011 | Waltho et al. |
| 8,483,155 B1 | 7/2013 | Banerjea et al. |
| 8,583,129 B2 | 11/2013 | Kim et al. |
| 8,588,158 B2 | 11/2013 | Kim et al. |
| 8,588,160 B2 | 11/2013 | Kim et al. |
| 8,605,741 B2 | 12/2013 | Kim et al. |
| 8,792,466 B2 | 7/2014 | Kim et al. |
| 2002/0027919 A1 | 3/2002 | Eneroth et al. |
| 2002/0154653 A1 | 10/2002 | Benveniste |
| 2003/0050012 A1 | 3/2003 | Black et al. |
| 2003/0093526 A1 | 5/2003 | Nandagopalan et al. |
| 2004/0151137 A1 | 8/2004 | McFarland et al. |
| 2005/0003827 A1 | 1/2005 | Whelan |
| 2005/0043047 A1 | 2/2005 | Vigier et al. |
| 2005/0063334 A1 | 3/2005 | Fnu et al. |
| 2005/0070279 A1 | 3/2005 | Ginzburg et al. |
| 2005/0169292 A1 | 8/2005 | Young |
| 2006/0034236 A1 | 2/2006 | Jeong et al. |
| 2006/0062183 A1* | 3/2006 | Forte et al. ............... 370/331 |
| 2006/0067354 A1 | 3/2006 | Waltho et al. |
| 2006/0089964 A1 | 4/2006 | Pandey et al. |
| 2006/0218392 A1 | 9/2006 | Jonston |
| 2007/0014267 A1 | 1/2007 | Lam et al. |
| 2007/0047492 A1 | 3/2007 | Kim et al. |
| 2007/0192472 A1 | 8/2007 | Tokunaga et al. |
| 2007/0253394 A1 | 11/2007 | Horiguchi et al. |
| 2008/0025282 A1 | 1/2008 | Hong |
| 2008/0130519 A1 | 6/2008 | Bahl et al. |
| 2008/0151796 A1* | 6/2008 | Jokela ............... H04W 48/08 370/310 |
| 2008/0165754 A1 | 7/2008 | Hu |
| 2008/0171552 A1 | 7/2008 | Hyon et al. |
| 2008/0240024 A1 | 10/2008 | Rao et al. |
| 2008/0268832 A1 | 10/2008 | Peng |
| 2008/0298333 A1 | 12/2008 | Seok |
| 2009/0061783 A1 | 3/2009 | Choi et al. |
| 2009/0111463 A1 | 4/2009 | Simms et al. |
| 2009/0158282 A1 | 6/2009 | Blaisdell et al. |
| 2009/0171930 A1 | 7/2009 | Vaughan et al. |
| 2009/0191906 A1 | 7/2009 | Abedi |
| 2009/0196180 A1 | 8/2009 | Bahl et al. |
| 2009/0197627 A1 | 8/2009 | Kuffner et al. |
| 2009/0207800 A1 | 8/2009 | Shan et al. |
| 2009/0217333 A1 | 8/2009 | Young et al. |
| 2009/0268674 A1 | 10/2009 | Liu et al. |
| 2009/0270079 A1 | 10/2009 | Han et al. |
| 2009/0280748 A1 | 11/2009 | Shan et al. |
| 2009/0298522 A1 | 12/2009 | Chaudhri et al. |
| 2009/0323835 A1 | 12/2009 | Rao et al. |
| 2009/0325499 A1 | 12/2009 | Corke et al. |
| 2010/0008285 A1 | 1/2010 | Kuroda |
| 2010/0030907 A1 | 2/2010 | Pollak |
| 2010/0034160 A1 | 2/2010 | Prakash et al. |
| 2010/0048234 A1* | 2/2010 | Singh ............... 455/509 |
| 2010/0061299 A1 | 3/2010 | Kennedy et al. |
| 2010/0069013 A1 | 3/2010 | Chaudhri et al. |
| 2010/0081449 A1 | 4/2010 | Chaudhri et al. |
| 2010/0091712 A1 | 4/2010 | Lu et al. |
| 2010/0111235 A1 | 5/2010 | Zeng et al. |
| 2010/0124254 A1 | 5/2010 | Wu et al. |
| 2010/0142458 A1 | 6/2010 | Mark |
| 2010/0175101 A1 | 7/2010 | Devictor et al. |
| 2010/0177756 A1 | 7/2010 | Choi et al. |
| 2010/0195580 A1* | 8/2010 | Samarasooriya et al. .... 370/329 |
| 2010/0195590 A1 | 8/2010 | Park |
| 2010/0195667 A1 | 8/2010 | Wang et al. |
| 2010/0220687 A1 | 9/2010 | Reznik et al. |
| 2010/0229205 A1 | 9/2010 | Hakusui |
| 2010/0232372 A1 | 9/2010 | Jakllari et al. |
| 2010/0246434 A1 | 9/2010 | Wang et al. |
| 2010/0246506 A1 | 9/2010 | Krishnaswamy |
| 2010/0303026 A1 | 12/2010 | Chaudhri et al. |
| 2010/0309317 A1 | 12/2010 | Wu et al. |
| 2010/0309806 A1 | 12/2010 | Wu et al. |
| 2011/0043710 A1 | 2/2011 | Samarasooriya et al. |
| 2011/0091393 A1 | 4/2011 | Simmonds et al. |
| 2011/0116458 A1* | 5/2011 | Hsu ............... H04W 16/14 370/329 |
| 2011/0122855 A1 | 5/2011 | Henry |
| 2011/0164581 A1 | 7/2011 | Keon |
| 2011/0222488 A1 | 9/2011 | Kim et al. |
| 2011/0243078 A1 | 10/2011 | Kim et al. |
| 2011/0280228 A1 | 11/2011 | McCann et al. |
| 2011/0286405 A1 | 11/2011 | Kim et al. |
| 2011/0287802 A1 | 11/2011 | Ma et al. |
| 2012/0026941 A1 | 2/2012 | Ahmad et al. |
| 2012/0063364 A1 | 3/2012 | Emmelmann et al. |
| 2012/0096492 A1 | 4/2012 | Urban et al. |
| 2012/0096498 A1 | 4/2012 | Wu et al. |
| 2012/0120904 A1 | 5/2012 | Seok et al. |
| 2012/0165056 A1 | 6/2012 | Kim et al. |
| 2012/0170534 A1 | 7/2012 | Kim et al. |
| 2012/0208558 A1 | 8/2012 | Bajko et al. |
| 2012/0218956 A1 | 8/2012 | Kim et al. |
| 2012/0315855 A1 | 12/2012 | Li et al. |
| 2013/0103684 A1 | 4/2013 | Yee et al. |
| 2014/0113649 A1 | 4/2014 | Bajko et al. |

FOREIGN PATENT DOCUMENTS

| | | |
|---|---|---|
| CN | 1745528 A | 3/2006 |
| CN | 101006683 A | 7/2007 |
| CN | 101242333 A | 8/2008 |
| JP | 2000-504163 A | 4/2000 |
| JP | 2004-286460 A | 10/2004 |
| JP | 2007-043391 A | 2/2007 |
| JP | 2007-184850 A | 7/2007 |
| JP | 2007300419 A | 11/2007 |
| JP | 2008-278456 A | 11/2008 |
| JP | 2009-200582 A | 9/2009 |
| JP | 2013-520938 A | 6/2013 |
| JP | 2013-530608 A | 7/2013 |
| JP | 2013-535853 A | 9/2013 |
| KR | 10-2009-0021865 | 3/2009 |
| WO | 2006/117587 | 11/2006 |
| WO | 2009/016800 A2 | 2/2009 |
| WO | 2009/031825 | 3/2009 |
| WO | 2009/061779 A1 | 5/2009 |
| WO | 2009/069068 | 6/2009 |
| WO | 2009/136760 A1 | 11/2009 |

OTHER PUBLICATIONS

Hung-Yu Wei et al., "Two-Hop-Relay Architecture for Next-Generation WWAN/LAN Integration," IEEE Wireless Communications, Apr. 2004, pp. 2-9.

Suresh Singh et al., "PAMAS-Power Aware Multi-Access Protocol with Signalling for Ad Hoc Networks," Computer Communication Review, vol. 28, Issue 3, Jul. 1998, pp. 5-26.

Juha Ala-Laurila et al., "Wireless LAN Access Network Architecture for Mobile Operators," Computer Communication Review, IEEE Communications Magazine, Nov. 2001, pp. 82-89.

Office Action issued in related U.S. Appl. No. 13/046,048 dated Dec. 7, 2012.

Office Action issued in related U.S. Appl. No. 12/910,186 dated Dec. 6, 2012.

Notice of Allowance issued in related U.S. Appl. No. 13/096,289 dated Dec. 10, 2012.

Srivastava et al. "Expanding Wireless Communication with 'White Space,'"White Paper of Dell Inc., Oct. 2008.

Stevenson et al. "IEEE 802.22: The First Cognitive Radio Wireless Regional Area Network Standard," IEEE Communications Magazine, Jan. 2009, pp. 130-138.

Sturza et al. "White Spaces Engineering Study: can cognitive radio technology operating in the TV white spaces completely protect

(56) References Cited

OTHER PUBLICATIONS licensed TN broadcasting?" New America Foundation Wireless Future Program, working paper No. 16, Jan. 2007.
Bahl et al. "White Space Networking with Wi-Fi like Connectivity," ACM SIGCOMM 2009, Aug. 19, 2009.
Pagadarai et al. "Wireless Spectrum Characterisation and Dynamic Utilization in Vehicular Communication Networks," Final Report, Wireless Innovation Laboratory, Worcester Polytechnic Institute, Sep. 30, 2009.
Han et al., "Introduction of Cognitive Radio Network, KIISE Information Review", vol. 22, No. 2, pp. 1-16, Nov. 2008.
Mangold et al., "Spectrum agile radio: radio resource measurements for opport unities spectrum usage", IEEE Global telecommunications conference Nov. 29, 2004-Dec. 1, 2004, vol. 6, pp. 3467-3471, Nov. 2004.
Challapali et al., "Spectrum agile radio: detecting spectrum opportunities", ISART, Boulder, Colorado, Mar. 2-4, 2004.
Cordeiro et al., "IEEE 802.22: An introduction to the first wireless standard based on cognitive radios", IEEE Journal of communications, vol. 1, No. 1, pp. 38-47, Apr. 2006.
PCT International Search Report for Application No. PCT/KR2011/001885 dated Oct. 26, 2011.
PCT International Search Report for Application No. PCT/KR2011/002276 dated Dec. 28, 2011.
PCT International Search Report for Application No. PCT/KR2010/06955 dated Jun. 24, 2011.
PCT International Search Report for Application No. PCT/KR2009/006103 dated Sep. 10, 2010.
PCT International Search Report for Application No. PCT/KR2009/06104 dated Sep. 30, 2010.
PCT International Search Report for Application No. PCT/KR2010/007011 dated Jun. 21, 2011.
PCT International Search Report for Application No. PCT/KR2010/006954 dated Jun. 24, 2011.
PCT International Search Report for Application No. PCT/KR2010/007076 dated Jun. 24, 2011.
Office Action from corresponding U.S. Appl. No. 12/993,409 dated Jan. 4, 2012.
Nan Hao, et al., Short-Range Wlan Compatible Hybrid Cognitive Radio Networks System and MAC Protocol, Communication Software and Networks, 2009, ICCSN 2009 International Conference on Communication Software and Networks, IEEE, Feb. 28, 2009, pp. 81-86.
Chinese Office Action dated Dec. 23, 2013, issued in Chinese Patent Application No. 200980161376.8.
U.S. Office Action dated Jan. 6, 2014, issued in U.S. Appl. No. 12/993,409.
Ha Nguyen Tran et al., "Requirements and Amendment Regarding TVWS Database Access," IEEE 802.11-10/0262r1, IEEE mentor, Mar. 17, 2010.
Necati Canpolat et al., "TGu Single GAS Protocol," IEEE 802.11-10/0266r49, IEEE mentor, Mar. 18, 2010.
Eunsun Kim et al., "Normative Text for Scanning in TV Whitespaces," IEEE 802.11-10/0472r2, IEEE mentor, May 11, 2010.
U.S. Office Action dated Jan. 16, 2014, issued in U.S. Appl. No. 14/074,276.
Canadian Office Action dated Feb. 3, 2014, issued in Canadian Patent Application No. 2773660.
Notice of Allowance dated Apr. 25, 2014, issued by the U.S. Patent & Trademark Office in U.S. Appl. No. 12/993,409.
Office Action dated May 23, 2014, issued by the U.S. Patent & Trademark Office in U.S. Appl. No. 14/074,276.
Office Action dated Jun. 27, 2014, issued by the State Intellectual Property Office of China in Chinese Patent Application No. 201080065876.4.
Office Action dated Jun. 25, 2014, issued by the U.S. Patent and Trademark Office in U.S. Appl. No. 12/908,449.
Nekovee, Maziar, "A Survey of Cognitive Radio Access to TV White Spaces," Ultra Modern Telecommunications & Workshops, ICUMT'09, International Conference on, Oct. 12, 2009, pp. 1-8.
Office Action dated Mar. 7, 2014, issued by the U.S. Patent & Trademark Office in U.S. Appl. No. 12/908,449.
Office Action dated Apr. 1, 2014, issued by the State Intellectual Property Office of China in Chinese Patent Application No. 201080058187.0.
Shkumbin Hamiti, Nokia, SDD editor, IEEE 802.16m System Description Document [Draft], IEEE 802.16m-08/003r8, IEEE, Apr. 10, 2009.
Office Action dated Jul. 3, 2014, issued by the State Intellectual Property Office of China in Chinese Patent Application No. 201080065374.1.
Chen Sun et al., Enabling Procedure of Communication in TVWS under FCC rules, IEEE 802.11-10/261r0, Feb. 2010.
Notice of Allowance dated Oct. 29, 2014, issued by the U.S. Patent and Trademark Office in U.S. Appl. No. 12/908,449.
Office Action dated Dec. 18, 2014, issued by the U.S. Patent and Trademark Office in U.S. Appl. No. 14/288,559.
Office Action dated Dec. 19, 2014, issued by the U.S. Patent and Trademark Office in U.S. Appl. No. 14/052,603.
Office Action dated Nov. 26, 2014, issued by the State Intellectual Property Office in Chinese Patent Application No. 201180038039.7.
USPTO Office Action dated Aug. 7, 2013 in related technology U.S. Appl. No. 13/384,844.
USPTO Office Action dated Sep. 5, 2013 in related technology U.S. Appl. No. 12/908,449.
Office Action dated Sep. 25, 2015, issued by the U.S. Patent and Trademark Office in U.S. Appl. No. 14/617,905.

* cited by examiner

Figure 7

| B0 | | B5 B6 | | | | B30 |
|---|---|---|---|---|---|---|
| Latitude Resolution | | | Latitude Fraction | | | |
| Bits | | 6 | | 25 | | |
| B31 | | | B39 B40 | | B45 | B30 |
| | Latitude Integer | | | Longitude Resolution | | |
| Bits | | 6 | | 6 | | |
| B31 | | | B39 B40 | | B70 B71 | B79 |
| | | Longitude Fraction | | | Longitude Integer | |
| Bits | | | 25 | | 9 | |
| B80 | B83 B84 | | | B89 B90 | | B9 |
| Altitude Type | | Altitude Resolution | | | Altitude Fraction | |
| Bits | 4 | | 6 | | 8 | |
| B80 | | | | B119 B120 | | B122 |
| | | Altitude Interger | | | Altitude Fraction | |
| Bits | | 22 | | | 3 | |
| B123 | | B124 | B125 | B126 | | B127 |
| RegLoc Agreement | | Regloc DSE | Dependent STA | Reserved | | |
| Bits | | 1 | 1 | 1 | 2 | |
| B128 | | | | | | B143 |
| | | Dependent Erablement Identifier | | | | |
| Bits | | | 16 | | | |
| B144 | | | B151 B152 | | | B159 |
| | Regulatory Class | | | Channel Number | | |
| Bits | | 8 | | 8 | | |

Figure 8

| Category | Action Value | Requester STA Address | Responder STA Address | Reason Result Code | Enablement Identifer |
|---|---|---|---|---|---|

Octets :   1           1           6           6           1           2

Figure 9

| Element ID | Length | Advertisement Protocol Tuple #1 | Advertisement Protocol Tuple #2 (optional) | Advertisement Protocol Tuple #n (optional) |
|---|---|---|---|---|
| 1 | 1 | Variable | Variable | Variable |

Octets:

| Query Response Length Limit | PAME-BI | Advertisement Protocol ID |
|---|---|---|
| 1 | | Variable |

Octets:

Figure 11

| Info ID | Length | Information |
|---|---|---|
| 2 | 2 | Variable |

Octets:

Figure 12

| Info ID | Length | DSE Enabling STA Address | DSE Registered Location element body field |
|---|---|---|---|
| 2 | 2 | 6 | 20 |

Octets :

Figure 13

| Info ID | Length | Requester STA Address | Responder STA Address | Reason Result Code | Enablement Identifer | White Space Map element body |
|---------|--------|----------------------|----------------------|--------------------|-----------------------|------------------------------|

Octets :   1   2   6   6   1   2   Variable

Figure 14

| WSM Type | WSM Information |
|----------|-----------------|

Octets :    1        Variable

Figure 15

These two fields are repeated, as determined by the Length field

| Map ID | Channel Number | Maximum Power Level |
|--------|----------------|---------------------|

Octets :   1   1   1

Figure 16

| Type | Map version |
|------|-------------|
| 0    | 1-7         |

Octets :

METHOD AND APPARATUS FOR DYNAMIC STATION ENABLEMENT PROCEDURE IN A WIRELESS LOCAL AREA NETWORK SYSTEM

CROSS REFERENCE TO RELATED APPLICATIONS

This application claims the benefit of the U.S. provisional Application Nos. 61/346,017, 61/358,405, and 61/351,945, filed on May 18, 2010, Jun. 24, 2010, and Jun. 7, 2010, respectively, which are hereby incorporated by reference as if fully set forth herein.

BACKGROUND OF THE INVENTION

1. Field of the Invention

The present invention relates to a wireless local area network (WLAN), and more particularly, to a method of dynamic station enablement procedure in a wireless local area network (WLAN).

2. Discussion of the Related Art

The standard for a Wireless Local Area Network (WLAN) technology is established by IEEE 802.11 standard association. IEEE 802.11a/b among IEEE 802.11 standards provides 11 Mbps (IEEE 802.11b) or 54 Mbps (IEEE 802.11a) transmission efficiency using unlicensed band on 2.4 GHz or 5 GHz frequency band. IEEE 802.11g, adapting OFDM (Orthogonal Frequency Divisional Multiplexing) technology, provides 54 Mbps transmission efficiency. And, IEEE 802.11n, adapting MIMO-OFDM technology, provides 300 Mbps transmission efficiency for 4 spatial streams. IEEE 802.11n provides 40 MHz channel bandwidth, and in this case it provides up to 600 Mbps transmission efficiency.

Now, a standard for regulating the WLAN operation in TV White Space is under establishment, as IEEE 802.11 af.

TV Whitespace includes channels allocated to broadcast TV, which are permitted to be used by cognitive radio device. TV White Space may include UHF band and VHF band. The spectrum not used by a licensed device (hereinafter, can be called as 'White Space') can be used by an unlicensed device. The frequency band permitted to be used by unlicensed device can be differently defined for each country. Generally, this frequency band comprises 54-698 MHz (US, Korea), and some of this frequency band can't be used for the unlicensed device. Here, 'licensed device' means a device of the user permitted in this frequency band, and can be differently called as 'primary user', or 'incumbent user'. Hereinafter, the term of 'incumbent user' can be collectively used for these terms.

The unlicensed device, which wishes to use the TV White Space (TVWS), shall acquire information for available channel list at its location. Hereinafter, the unlicensed device operating in the TVWS using MAC (Medium Access Control) and PHY (Physical) operation according to IEEE 802.11 can be called as TVWS terminal.

Unlicensed device should provide a protection mechanism for the incumbent user. That is, the unlicensed device should stop using a specific channel, when an incumbent user, such as wireless microphone, is using that specific channel. For this purpose, spectrum sensing mechanism is required. Spectrum sensing mechanism comprises Energy Detection scheme, Feature Detection scheme, etc. By using this mechanism, unlicensed device determines that the channel is used by an incumbent user, when the strength of the primary signal is greater than a predetermined level, or when DTV (Digital Television) Preamble is detected. And, the unlicensed device (station or Access Point) shall lower its transmission power, when it is detected that the neighboring channel, next to the channel used by the unlicensed device, is used by the incumbent user.

SUMMARY OF THE INVENTION

Technical Problem

One aspect of the present invention is for the enabling mechanism of letting the unlicensed device to operate efficiently in TVWS.

The object of the present invention is not limited the above stated objects, but includes various objects recited or apparent among the detailed description of the present invention.

Technical Solution

One aspect of the present invention provides A method of performing an enablement procedure by a first station in a regulatory domain where an unlicensed device is permitted to operate at a given time in a given geographical area with regard to a licensed device in a wireless local area network (WLAN), comprising: receiving, from a second station, an enabling signal including advertisement protocol element with an advertisement protocol identification (ID) field which indicates an advertisement protocol the second station supports; and exchanging DSE (dynamic station enablement) related messages with the second station using a GAS (generic advertisement service) protocol.

Here, the step of exchanging DSE related messages comprises transmitting, to the second station, first query protocol element for DSE enablement request, the first query protocol element including first information (Info) ID; and receiving, from the second station, second query protocol element for DSE enablement response, the second query protocol element including second Info ID, wherein the first Info ID and the second Info ID indicate information related with the first query protocol element and the second query protocol element respectively, and the first Info ID and the second Info ID are set to a value for DSE enablement.

Preferably, the second query protocol element may include white space map element including a list of available channels.

Preferably, the WSM element may comprise a channel number field and a maximum power level field, wherein the channel number field indicates the list of available channels and the maximum power level field indicates maximum allowed transmission powers of the available channels.

Preferably, the method can further comprises transmitting, to the second station, a first frame to request the enabling signal using the GAS protocol.

Preferably, the enabling signal can be a second frame including DSE registered location information.

Preferably, the second station can be an enabling station which is a station determining available channels at its location using its own geographic location identification and a regulatory database access capability.

Preferably, the first station can be a dependent station which is a station receiving an available channel list from the enabling station or a dependent AP (access point) of that enabling station that enables an operation of the dependent station.

Another aspect of the present invention provides a method of supporting an enablement procedure of a first station by a second station in a regulatory domain where an unlicensed device is permitted to operate at a given time in a given geographical area with regard to a licensed device in a wireless local area network (WLAN) comprising transmitting, to the first station, an enabling signal including advertisement protocol element with an advertisement protocol identification (ID) field which indicates an advertisement protocol the second station supports; and exchanging DSE (dynamic station enablement) related messages with the first station using a GAS (generic advertisement service) protocol.

Another aspect of the present invention provides an apparatus of performing an enablement procedure in a regulatory domain where an unlicensed device is permitted to operate at a given time in a given geographical area with regard to a licensed device in a wireless local area network (WLAN), comprising: a transceiver configured to receive, from a enabling station, an enabling signal including advertisement protocol element with an advertisement protocol identification (ID) field which indicates an advertisement protocol the enabling station supports, and to exchange DSE (dynamic station enablement) related messages with the enabling station using a GAS (generic advertisement service) protocol; and a processor configured to process the enabling signal and the DSE related messages.

Another aspect of the present invention provides an apparatus of supporting an enablement procedure of a dependent station in a regulatory domain where an unlicensed device is permitted to operate at a given time in a given geographical area with regard to a licensed device in a wireless local area network (WLAN) comprising a transceiver configured to transmit an enabling signal including advertisement protocol element with an advertisement protocol identification (ID) field which indicates an advertisement protocol the apparatus station supports to the dependent station, and exchange DSE (dynamic station enablement) related messages with the dependent station using a GAS (generic advertisement service) protocol; and a processor configured to generate the enabling signal.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 7 shows an exemplary format of Registered Location element body field.

FIG. 8 shows an exemplary DSE Enablement Frame format.

FIG. 9 shows the Advertisement Protocol element format.

FIG. 10 shows the format of Advertisement Protocol Tuple.

FIG. 11 shows a query protocol element format.

FIG. 12 shows the format of a query protocol element included in the Query Response field of the GAS Initial Response frame.

FIG. 13 shows the format of a query protocol element for DSE enablement.

FIG. 14 shows a WSP element body.

FIG. 15 shows one exemplary structure of TV Band WSM.

FIG. 16. illustrates the format of the Map ID bits.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart.

First of all, Wireless Local Area Network (WLAN) system in which embodiments of the present invention can be applied is explained.

Figure 1:
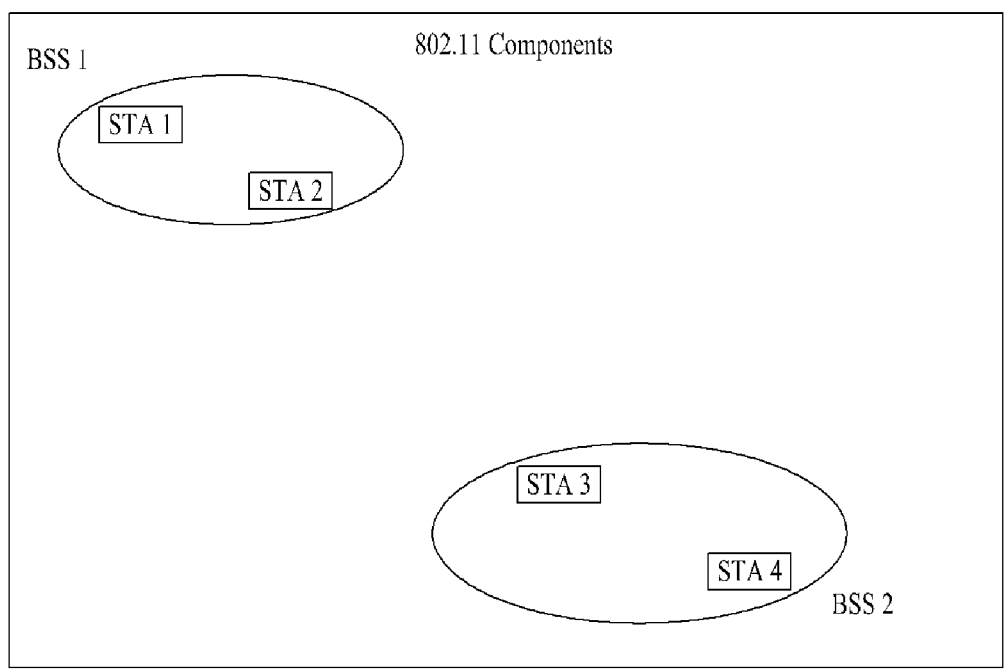
FIG. 1 shows an exemplary architecture of IEEE 802.11 system.

FIG. 1 shows an exemplary architecture of IEEE 802.11 system.

The IEEE 802.11 architecture consists of several components that interact to provide a WLAN that supports STA (station) mobility transparently to upper layers. The basic service set (BSS) is the basic building block of an IEEE 802.11 LAN. FIG. 1 shows two BSSs, each of which has two STAs that are members of the BSS. It is useful to think of the ovals used to depict a BSS as the coverage area within which the member STAs of the BSS may remain in communication. (The concept of area, while not precise, is often good enough.) This area is called the Basic Service Area (BSA). If a STA moves out of its BSA, it can no longer directly communicate with other STAs present in the BSA.

The independent BSS (IBSS) is the most basic type of IEEE 802.11 LAN. A minimum IEEE 802.11 LAN may consist of only two STAs. Since the BSSs shown in FIG. 1 are simple and lack other components (contrast this with FIG. 2), the two can be taken to be representative of two IBSSs. This mode of operation is possible when IEEE 802.11 STAs are able to communicate directly. Because this type of IEEE 802.11 LAN is often formed without pre-planning, for only as long as the LAN is needed, this type of operation is often referred to as an ad hoc network.

A STA's membership in a BSS is dynamic (STAs turn on, turn off, come within range, and go out of range). To become a member of a BSS, a STA joins the BSS using the synchronization procedure. To access all the services of an infrastructure BSS, a STA shall become "associated." These associations are dynamic and involve the use of the distribution system service (DSS).

Figure 2:
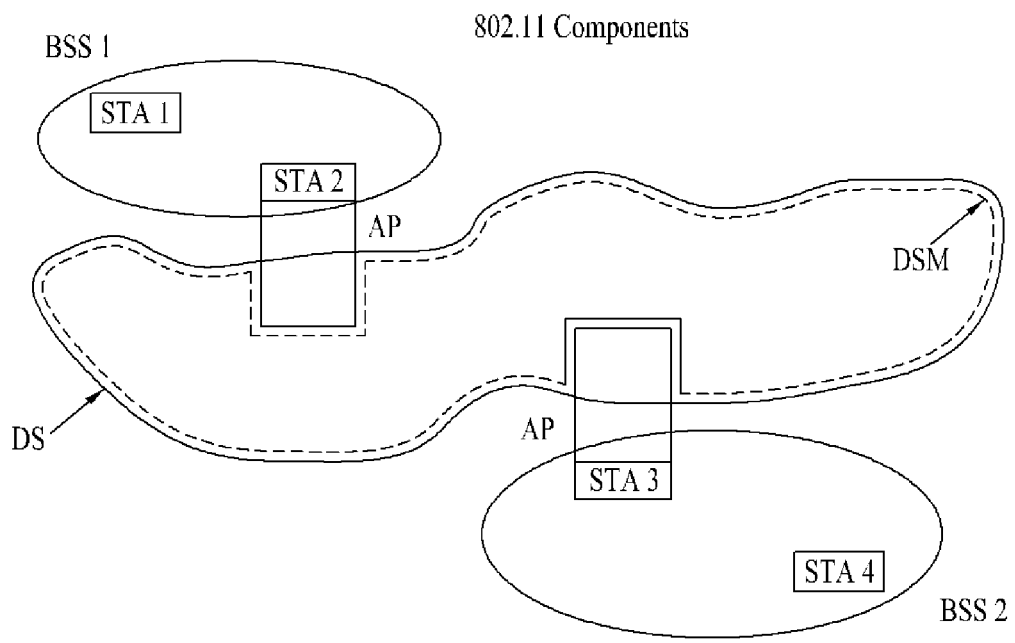
FIG. 2 is another exemplary architecture of IEEE 802.11 system in which the DS, DSM and AP components are added to the IEEE 802.11 architecture picture.

FIG. 2 is another exemplary architecture of IEEE 802.11 system in which the DS, DSM and AP components are added to the IEEE 802.11 architecture picture.

PHY limitations determine the direct station-to-station distance that may be supported. For some networks, this distance is sufficient; for other networks, increased coverage is required. Instead of existing independently, a BSS may also form a component of an extended form of network that is built with multiple BSSs. The architectural component used to interconnect BSSs is the DS (Distribution System).

IEEE Std 802.11 logically separates the WM (wireless Medium) from the distribution system medium (DSM). Each logical medium is used for different purposes, by a different component of the architecture. The IEEE 802.11 definitions neither preclude, nor demand, that the multiple media be either the same or different.

Recognizing that the multiple media are logically different is the key to understanding the flexibility of the architecture. The IEEE 802.11 LAN architecture is specified independently of the physical characteristics of any specific implementation.

The DS enables mobile device support by providing the logical services necessary to handle address to destination mapping and seamless integration of multiple BSSs.

An access point (AP) is any entity that has STA functionality and enables access to the DS, via the WM for associated STAs.

Data move between a BSS and the DS via an AP. Note that all APs are also STAs; thus they are addressable entities. The addresses used by an AP for communication on the WM and on the DSM are not necessarily the same.

Data sent to the AP's STA address by one of the STAs associated with it are always received at the uncontrolled port for processing by the IEEE 802.1X port access entity. In addition, if the controlled port is authorized, these frames conceptually transit the DS.

Hereinafter, Extended Service Set (ESS) for a large coverage network is explained.

Figure 3:
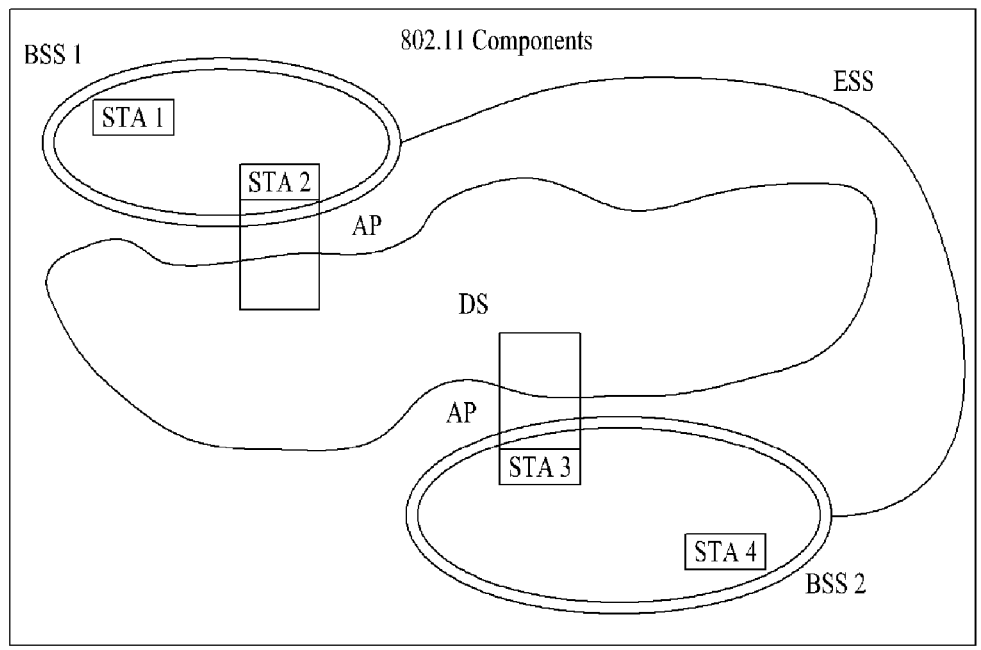
FIG. 3 shows another exemplary architecture of IEEE 802.11 system for explaining the concept of ESS.

FIG. 3 shows another exemplary architecture of IEEE 802.11 system for explaining the concept of ESS.

The DS and BSSs allow IEEE Std 802.11 to create a wireless network of arbitrary size and complexity. IEEE Std 802.11 refers to this type of network as the ESS network. An ESS is the union of the BSSs connected by a DS. The ESS does not include the DS. The key concept is that the ESS network appears the same to an LLC (logical link control) layer as an IBSS network. STAs within an ESS may communicate and mobile STAs may move from one BSS to another (within the same ESS) transparently to LLC.

Nothing is assumed by IEEE Std 802.11 about the relative physical locations of the BSSs in FIG. 3. All of the following are possible:

The BSSs may partially overlap. This is commonly used to arrange contiguous coverage within a physical volume.

The BSSs could be physically disjoint. Logically there is no limit to the distance between BSSs.

The BSSs may be physically collocated. This may be done to provide redundancy.

One (or more) IBSS or ESS networks may be physically present in the same space as one (or more) ESS networks. This may arise for a number of reasons. Some examples are when an ad hoc network is operating in a location that also has an ESS network, when physically overlapping IEEE 802.11 networks have been set up by different organizations, and when two or more different access and security policies are needed in the same location.

Figure 4:
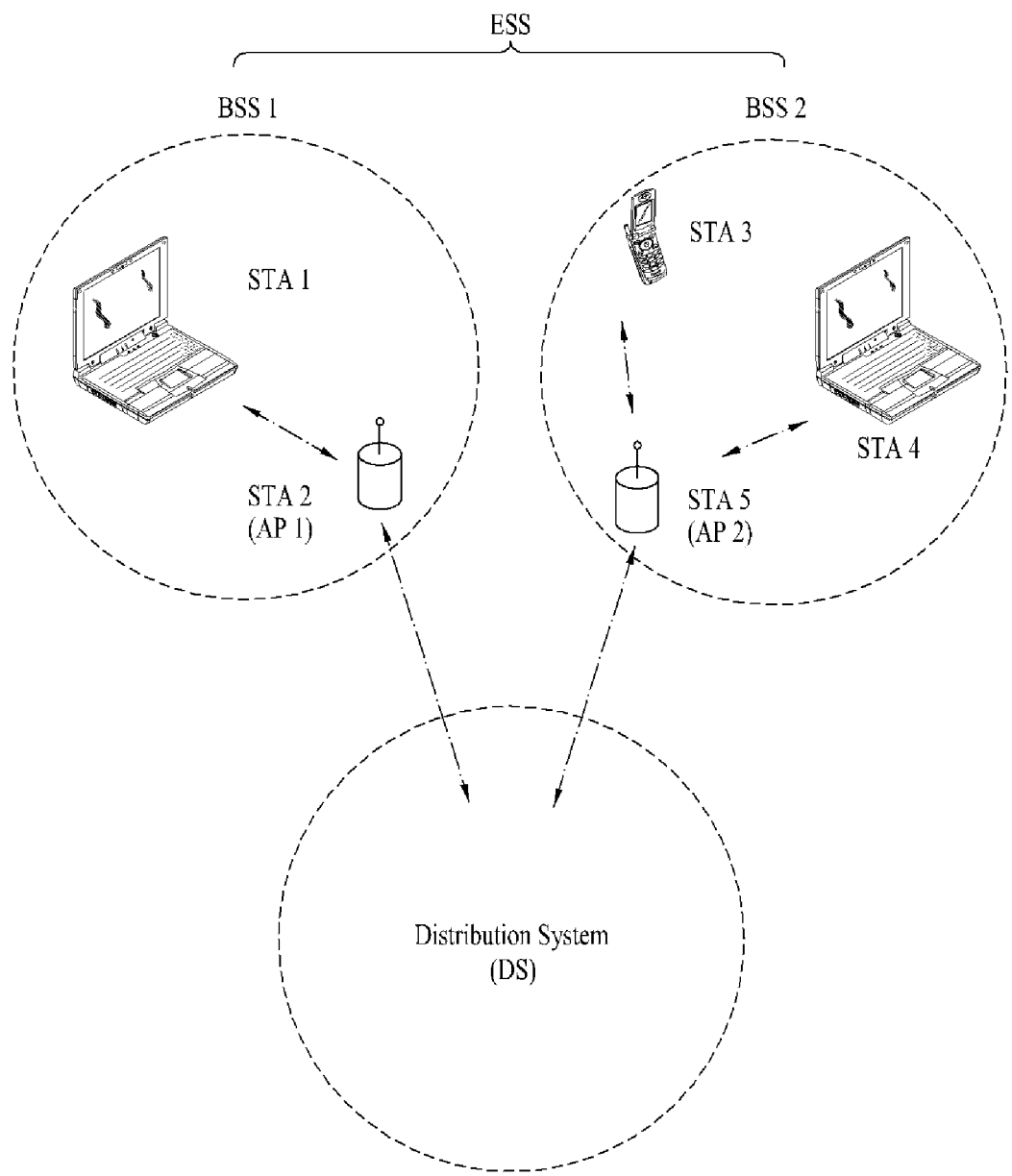
FIG. 4 shows exemplary system architecture for better understanding the WLAN system.

FIG. 4 shows exemplary system architecture for better understanding the WLAN system.

As can be understood, FIG. 4 is an example of infrastructure BSS including DS. And BSS 1 and BSS 2 consist of ESS. In WLAN system, a STA is a device operating according to MAC/PHY regulation of IEEE 802.11, and includes an AP STA and non-AP STA, such a laptop computer, mobile phone, etc. Usually, the device which a user directly handles is non-AP STA. Hereinafter, non-AP STA can be differently called as (terminal), WTRU (Wireless Transmit/Receive Unit), User Equipment (UE), Mobile Station (MS), Mobile Terminal, Mobile Subscriber Unit, etc. AP can corresponds to Base Station (BS), Node-B, BTS (Base Transceiver System), or Femto BS in another field of wireless communication.

First, the enabling mechanism of letting the unlicensed device to operate in TVWS (TV Whitespace) is explained.

Operation in TVWS will be described for example in an embodiment of the present invention. However the present invention is not restricted to operation in TVWS and can be applied to operation in domain where an unlicensed device is permitted to operate at a given time in a given geographical area with regard to a licensed device.

In order for the unlicensed device to operate in TVWS, the unlicensed device should acquire information for available channels in TVWS not used by incumbent users. The most casual approach for this is defining such that all the unlicensed devices performs sensing whether there is a primary signal of the incumbent user on each of the channels in TVWS. However, it may cost huge overhead, thus another approach can be using a regulatory database, such as TV band database which includes information which of the channels are available for the WLAN operation at specific geographic location. The present invention prefers to use the latter approach.

Further, if all the unlicensed devices access the regulatory database to acquire information for the available channels, it may be inefficient, and produce large signaling overhead. Thus, the unlicensed devices (STAs) are classified into an enabling STA and a dependent STA. Enabling STA in TVWS is defined as a STA determines the available TV channels at its location using its own geographic location identification and TV bands database access capabilities. Dependent STA in TVWS is defined as a STA receives available TV channel list from the enabling STA or the dependent AP of that enabling STA that enables its operation. Thus, enabling STA takes the role to permit the dependent STA to operate within TVWS within the available channels (the role to enable the dependent STA). This enabling procedure can be called as dynamic station enablement (DSE) procedure.

Figure 5:
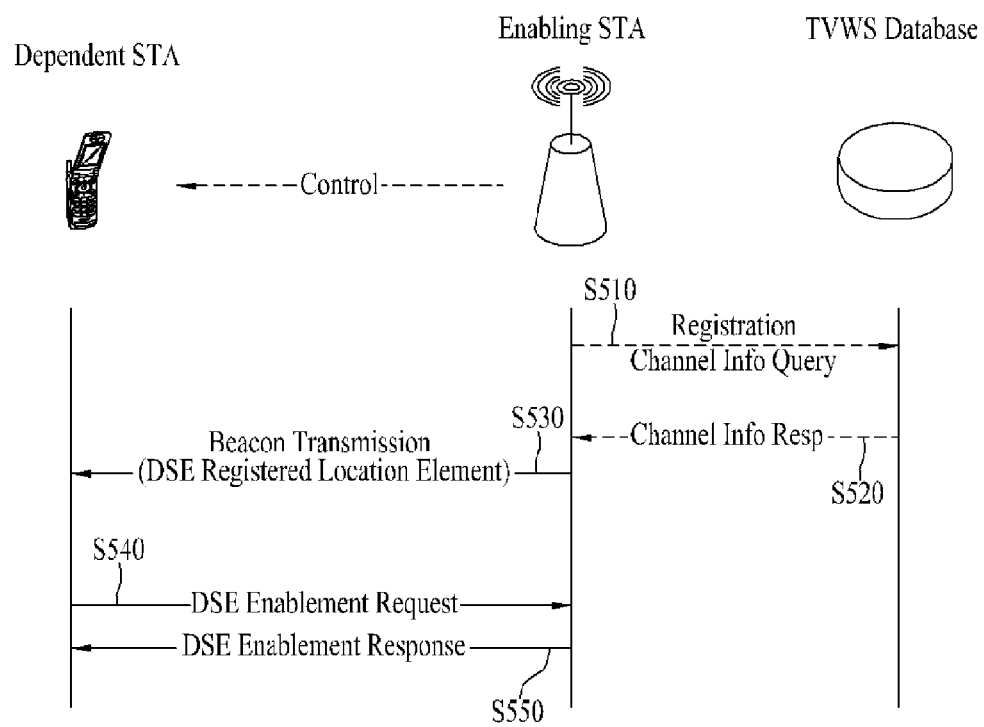
FIG. 5 is a conceptual diagram to explain the enabling mechanism according to one embodiment of the present invention.

FIG. 5 is a conceptual diagram to explain the enabling mechanism.

In FIG. 5, there is TVWS database, an enabling STA and a dependent STA. The enabling STA can be either an AP STA or non-AP STA.

According to the embodiment, the enabling STA access the TVWS database for registration and/or querying channel information (S510). It is more efficient for the enabling STA to acquire available channel list from TVWS database than sensing each of the channels to determine whether it is available or not. Thus, the enabling STA of FIG. 5 acquires the available channel list from TVWS database via Channel Info Response (S520).

Then, the enabling AP STA of this example may transmit beacon frame or probe response frame to the dependent STA (S530) as an enabling signal to permit the dependent STA to operate within TVWS. This enabling signal comprises the probe response frame or the beacon frame containing a DES Registered Location Element with 'DSE RegLoc bit' set to 1. However, enabling STA can transmit enabling signal on the band other than the TVWS. For example, the enabling STA can transmit the beacon frame containing a DES Registered Location Element with 'DSE RegLoc bit' set to 1 through 2.4 GHz band.

And, the dependent STA, according to the present embodiment, may exchange DSE related message with the enabling STA. More specifically, the dependent STA may transmit DSE Enablement Request message to the enabling STA for the enablement of the dependent STA (S540). Then, the enabling STA may respond to this request by DSE Enablement Response message (S550).

Figure 6:
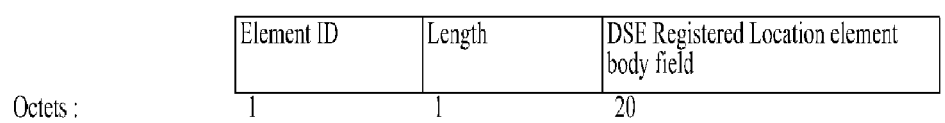
FIG. 6 shows an exemplary format of DSE Registered Location Element.

FIG. 6 shows an exemplary format of DSE Registered Location Element, and FIG. 7 shows an exemplary format of Registered Location element body field.

As stated above, DSE Registered Location element (FIG. 6) with RegLoc DSE bit (FIG. 7) set to 1 can be an enabling signal permitting the dependent STA to operate WLAN operation in TVWS. The dependent STA, receiving and decoding the DSE Registered Location element, may transmit Enablement Request Frame to the Enabling STA. The dependent STA shall transmit the Enablement Request Frame on a channel identified by 'Channel Number' field of Registered Location element body, as shown in FIG. 7. This channel identified by 'Channel Number' field of Registered Location element body can be located other than TVWS, or within TVWS. Then, the enabling STA transmits Enablement Response Frame to the dependent STA, and if the dependent STA receives it, the DSE procedure is completed.

FIG. 8 shows an exemplary DSE Enablement Frame format.

When DSE Enablement Frame format of FIG. 8 is DSE Enablement frame for DSE Enablement Request, RequesterSTAAddress field indicates MAC address of STA transmitting this DSE Enablement Frame, and ResponderSTAAddress field indicates MAC address of STA receiving this DSE Enablement Frame. Reason Result Code field may indicates whether this DSE Enablement Frame is for DSE Enablement Request, or DSE Enablement Response. Enablement identifier field may indicate enablement ID allocated by the enabling STA to the dependent STA, when DSE Enablement Frame is for DSE Enablement Response.

Thus, RequesterSTAAddress field of the DSE Enablement frame for DSE Enablement request transmitted by dependent STA indicates the MAC address of the dependent STA, and ResponderSTAAddress field indicates the MAC address of the enabling STA, and Reason Result Code field indicates this DSE Enablement Frame is for DSE Enablement Request. And, Enablement identifier field is set to invalid value.

When DSE Enablement Frame format of FIG. 8 is for DSE Enablement Response, the RequesterSTAAddress field of the DSE Enablement frame for DSE Enablement Response indicates the MAC address of the enabling STA, ResponderSTAAddress field indicates the MAC address of the Dependent STA, Reason Result Code field indicates that the DSE Enablement frame is for DSE Enablement Response. And, Enablement identifier field may include Enablement ID allocated to the dependent STA by the enabling STA.

Next, a method of dynamic station enablement procedure according to the embodiment of the present invention is explained. The embodiment of the present invention proposes a method of performing a DSE enablement procedure using a GAS (generic advertisement service) protocol.

A STA supporting a GAS protocol includes an Interworking element in a Beacon frame and a probe response frame. ID of an advertisement protocol which a STA supports is transmitted through an Advertisement Protocol element. FIG. 9 shows the Advertisement Protocol element format. The Advertisement Protocol element is transmitted through a Beacon frame or a Probe Response frame.

As shown in FIG. 9, the Advertisement Protocol element includes a plurality of Advertisement Protocol Tuple fields. The format of Advertisement Protocol Tuple is shown in FIG. 10.

As shown in FIG. 10, the Advertisement Protocol Tuple field includes The Query Response Length Limit field, the Pre-Association Message Exchange BSSID Independent (PAME-BI) field and Advertisement Protocol ID field.

The Query Response Length Limit field indicates the maximum number of octets a STA will transmit in the Query Response field contained within one or more GAS Comeback Response frames.

The PAME-BI field is used by an AP to indicate whether the Advertisement Server, which is the non-AP STA's peer for this Advertisement Protocol, will return a Query Response which is independent of the BSSID used for the GAS frame exchange.

The Advertisement Protocol ID field indicates an advertisement protocol which a STA supports.

Exemplary values of Advertisement Protocol IDs are defined in table 1.

TABLE 1

| Name | Value |
|---|---|
| Access Network Query Protocol | 0 |
| MIH Information Service | 1 |
| MIH Command and Event Service Capability Discovery | 2 |
| Emergency Alert System (EAS) | 3 |
| Location-to-Service Translation Protocol | 4 |
| Registered Location Query Protocol | 5 |
| Reserved | 6-220 |
| Vendor Specific | 221 |
| Reserved | 222-255 |

The Advertisement Protocol ID field is set to 0 to indicate the STA supports Access Network Query Protocol (ANQP), and the Advertisement Protocol ID field is set to 5 to indicate the STA supports Registered Location Query Protocol (RLQP). RLQP is a query protocol for registered location information retrieval transported by GAS Public Action frames.

In the embodiment of the present invention, DSE procedure is performed through ANQP or RLQP.

According to the embodiment of the present invention, an enabling signal is Beacon frame, a Probe response frame or a GAS initial response frame containing an Advertisement Protocol element with an Advertisement Protocol tuple whose Advertisement Protocol ID value is set to the value of the ANQP or the RLQP specified in Table 1, indicating that enablement is possible.

A case that an enabling signal is a GAS initial response frame will be explained referring to FIGS. 11 and 12.

According to the embodiment of the present invention, a dependent STA can acquire an enabling signal from an enabling STA or an AP through ANQP or RLQP.

First STA which received an ANQP (or RLQP) request from second STA can respond to a query with and without proxying the query to a server in an external network. For example, if the first STA receive an ANQP (or RLQP) request for enabling signal from second STA, the first STA can transmit ANQP (or RLQP) response including enabling information to the dependent STA through proxying the query to a server in an external network or using local information of the enabling STA or the AP.

A dependent STA transmits a GAS Initial Request frame to request DSE Registered Location information to an enabling STA or an AP.

Table 2 shows a GAS Initial Request frame format.

TABLE 2

| Order | Information |
|---|---|
| 1 | Category |
| 2 | Action |
| 3 | Dialog Token |
| 4 | Advertisement Protocol element |
| 5 | Query Request Length |
| 6 | Query Request |

As shown in table 2, the GAS Initial Request frame includes an Advertisement Protocol element and a Query Request field.

The Advertisement Protocol element of the GAS Initial Request frame includes Advertisement Protocol tuple whose Advertisement Protocol ID value is set to the value of the ANQP or the RLQP specified in Table 1.

The Query Request field includes information (Info) ID allocated for DSE Registered Location information. Info ID indicates information related with the query. For example, if a dependent STA transmits the GAS Initial Request frame through ANQP, the Advertisement Protocol element of the GAS Initial Request frame includes Advertisement Protocol tuple whose Advertisement Protocol ID value is set to the value of the ANQP, and the Query Request field includes ANQP Info ID allocated for DSE Registered Location information.

The enabling STA or the AP which received a GAS Initial Request frame transmits a GAS Initial Response frame to the dependent STA.

Table 3 shows a GAS Initial Response frame format.

TABLE 3

| Order | Information |
|---|---|
| 1 | Category |
| 2 | Action |
| 3 | Dialog Token |
| 4 | Status Code |
| 5 | GAS Comeback Delay |
| 6 | Advertisement Protocol element |
| 7 | Query Response Length |
| 8 | Query Response (optional) |

As shown in table 3, the GAS Initial Response frame includes an Advertisement Protocol element and a Query Response field. The Query Response field of the GAS Initial Response frame includes a query protocol element.

FIG. 11 shows a query protocol element format. That is, ANQP element format and RLQP element format are as FIG. 11. As show in FIG. 11, a query protocol element includes an Info ID field, a length field, and an information field.

Each query protocol element is assigned a unique Info ID pre-defined. Info ID indicates information related with the query. That is, Info ID indicates what the query protocol element is related with.

The information field of a query protocol element included in the Query Response field of the GAS Initial Response frame includes DSE Registered Location information. FIG. 12 shows the format of a query protocol element included in the Query Response field of the GAS Initial Response frame. As shown in FIG. 12, the query protocol element includes a DSE Enabling STA Address field and a DSE Registered Location body field.

If a dependent STA receive the enabling signal form a dependent AP, it does not know the address of an enabling STA. The dependent STA needs the address of an enabling STA to request enablement. Thus, the DSE Enabling STA Address field indicates the address of the enabling STA. The DSE Registered Location body field is same as FIG. 7, and indicates the registered location of the enabling STA.

After the dependent STA received the enabling signal, it exchanging DSE related messages with the enabling station using a GAS protocol. That is, the dependent STA transmits first query protocol element for DSE enablement request to the enabling station, the first query protocol element including first Info ID set to a value for DSE enablement, and receives second query protocol element for DSE enablement response from the enabling station, the second query protocol element including second Info ID set to a value for DSE enablement.

FIG. 13 shows the format of a query protocol element for DSE enablement.

As shown in FIG. 13, the query protocol element for DSE enablement includes an Info ID field, Length field, RequesterSTAAddress field, ResponderSTAAddress field, Reason Result Code field, an Enablement identifier field and White Space Map (WSP) element body.

The Info ID field shall be set to the value for DSE Enablement pre-defined.

The Length is a field that specifies indicates the length of the remaining element fields in octets, and the value is variable.

The RequesterSTAAddress field, the ResponderSTAAddress field, the Reason Result Code field, the Enablement identifier field are same as those of the DSE Enablement frame illustrated in FIG. 8.

FIG. 14 shows a WSM element body.

WSM element body comprises available channel list from the regulatory database. Further, as stated above, when the unlicensed device operates on a specific channel which is available in TVWS and the neighboring channel next to the specific channel is used by an incumbent user, the unlicensed device should lower its transmission power to protect the incumbent user. Therefore, WSM element comprises available channel list and maximum allowed transmission power of the available channels from the regulatory database. Actual maximum of transmission power level may be decided depending on the channel bandwidth and the maximum allowed transmission powers per available channel. When the operational channel bandwidth (WLAN channel) spans multiple channels indicated in the WSM, whose maximum power levels are different, the operational transmission power level shall be constrained by the minimum transmission power level of those multiple channels, which are indicated in the WSM.

As shown in FIG. 14, WSM element bode may comprise WSM Type field and WSM Information field.

WSM type field may indicate the type of WSM information. Specifically, WSM type may indicate whether WSM information is TV Band WSM, or other type of WSM. If WSM type indicates that the present WSM element is TV Band WSM element, this WSM element is a WSM element including the available channel list and the maximum transmission powers allowed for each of the available channels, which was acquired from TV band database by the enabling STA.

FIG. 15 shows one exemplary structure of TV Band WSM. As shown in FIG. 15, TV Band WSM may comprise MAP ID field, Channel Number field, Maximum Power Level field.

Figure 16:
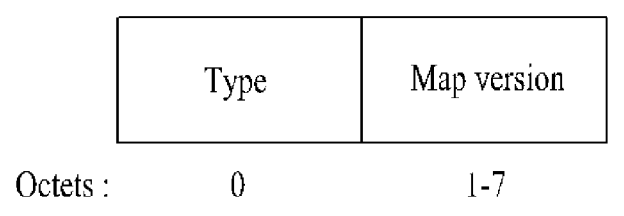

Map ID field is an identifier of the TV band WSM information field format for a TV band WSM and the format of the Map ID bits is illustrated in FIG. 16.

Referring to FIG. 16, type bit is one bit in length and indicates whether the following channel list is a full channel list or a partial channel list. If the Type bit is set to 1, the following channel list is a full channel list and if the Type bit is set to 0, the following channel list is a partial channel list.

Map version of FIG. 16 may be 6 bits in length and identifies the version of WSM. When the available channel information from the TV band database is updated and the corresponding WSM is updated, then the Map version is circularly incremented by 1 and the default bit value of the Map version is 0000000. If a STA receives several WSMs with the same Map version and the Type bit is set to 0 (partial WSM), the STA shall construct the whole channel list using the multiple WSMs having the same Map version.

Now, referring back to FIG. 15, the Channel Number field may be a positive integer value that indicates where the TV channel is available for WLAN operation. The length of the Channel Number field may be set as 1 octet. When the Channel Number and Maximum Power Level pairs are repeated (as indicated in FIG. 23), they shall be listed in increasing TV channel numbers.

Figure 17:
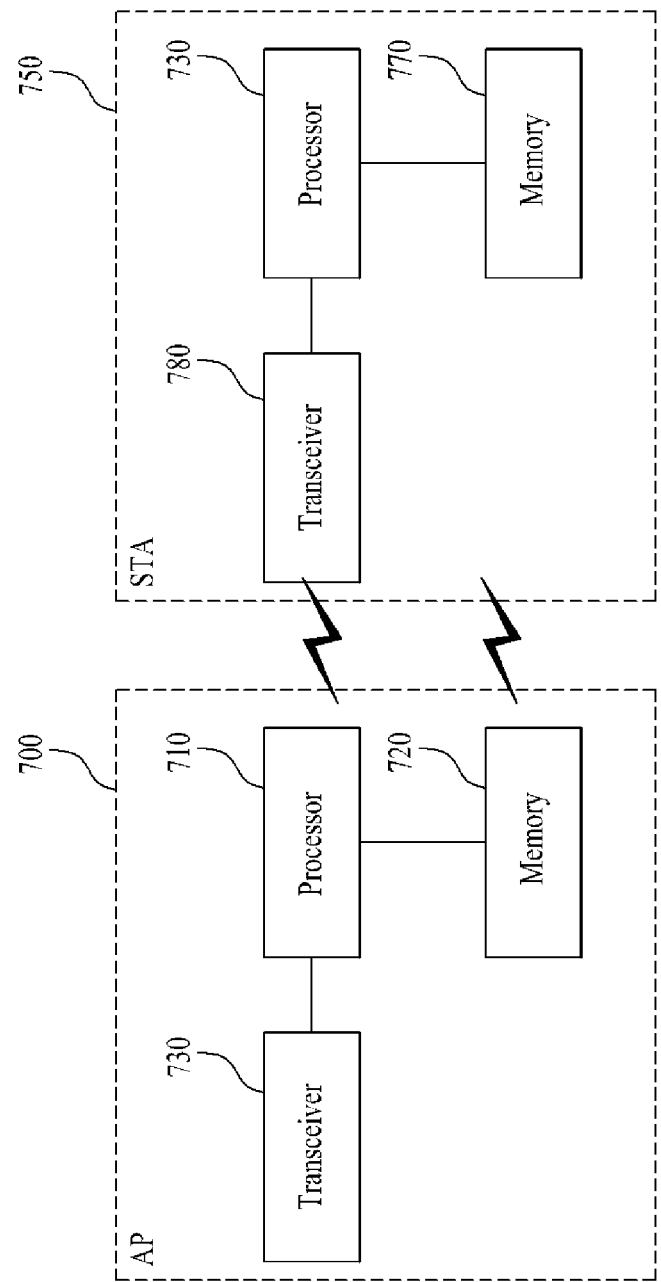
FIG. 17 is a schematic block diagram of wireless apparatuses implementing an exemplary embodiment of the present invention.

FIG. 17 is a schematic block diagram of wireless apparatuses implementing an exemplary embodiment of the present invention.

An AP 700 can include a processor 710, a memory 720, a transceiver 730, and a STA 750 may include a processor 760, a memory 770, and a transceiver 780. The transceivers 730 and 780 transmit/receive a radio signal and implement an IEEE 802 physical layer. The processors 710 and 760 are connected with the transceivers 730 and 760 to implement an IEEE 802 physical layer and/or MAC layer. The processors 710 and 760 may implement the above-described channel scanning method.

The processors 710 and 760 and/or the transceivers 730 and 780 may include an application-specific integrated circuit (ASIC), a different chip set, a logical circuit, and/or a data processing unit. The memories 720 and 770 may include a read-only memory (ROM), a random access memory (RAM), a flash memory, a memory card, a storage medium, and/or any other storage units. When an exemplary embodiment is implemented by software, the above-described scheme may be implemented as a module (process, function, etc.) performing the above-described functions. The module may be stored in the memories 720 and 770 and executed by the processors 710 and 760. The memories 720 and 770 may be disposed within or outside the processors 710 and 760 and connected with the processors 710 and 760 via well-known means.

Among these elements of apparatuses for AP/STA, the structure of processor 710 or 760 will be more specifically explained.

Figure 18:
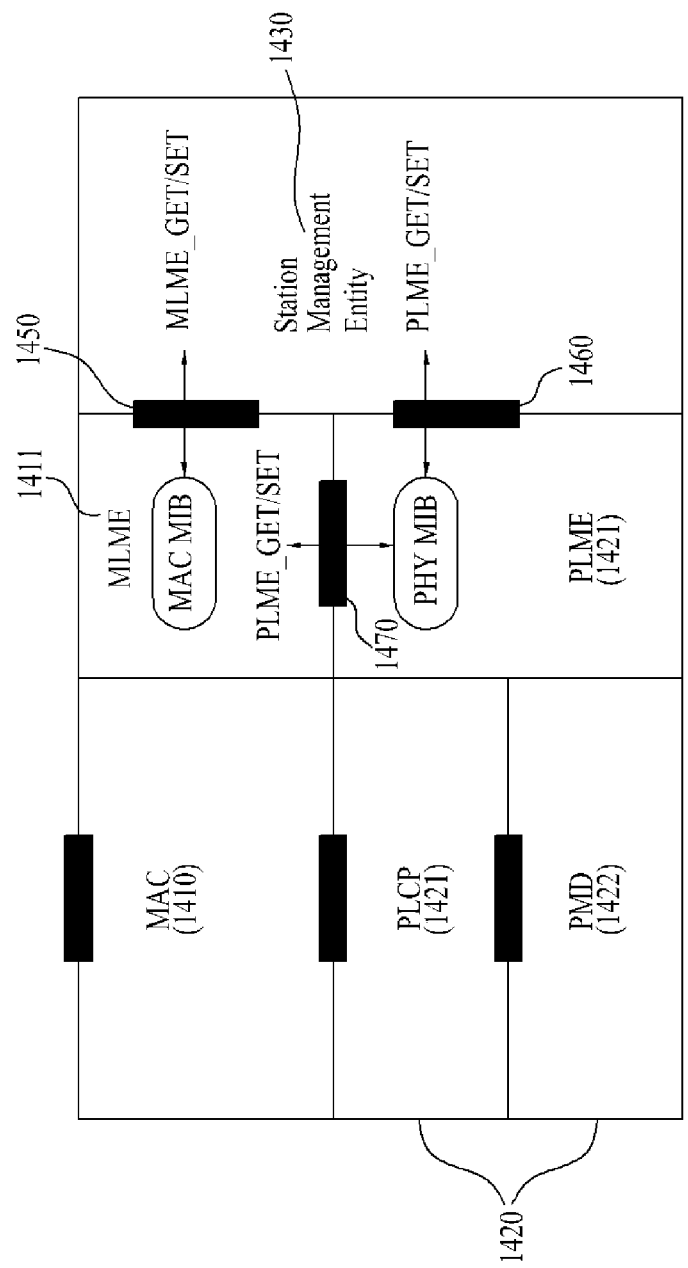
FIG. 18 shows an exemplary structure of processor of STA apparatus according to one embodiment of the present invention.

FIG. 18 shows an exemplary structure of processor of STA apparatus according to one embodiment of the present invention.

Processor 710 or 760 of STA may have multiple layer structures, and FIG. 17 especially focuses on MAC sublayer (1410) on data link layer (DLL) and Physical layer (1420) among these layers. As shown in FIG. 14, PHY (1420) may include PLCP entity (physical layer convergence procedure entity; 1421) and PMD entity (physical medium dependent entity; 1422). Both the MAC sublayer (1410) and PHY (1420) conceptually include management entities, called MLME (MAC sublayer Management Entity; 1411) and PLME (physical layer management entity; 1421), respectively. These entities (1411, 1421) provide the layer management service interfaces through which layer management functions can be invoked.

In order to provide correct MAC operation, an SME (Station Management Entity; 1430) is present within each STA. The SME (1430) is a layer independent entity that can be viewed as residing in a separate management plane or as residing "off to the side." The exact functions of the SME (1430) are not specified in this document, but in general this entity (1430) can be viewed as being responsible for such functions as the gathering of layer-dependent status from the various layer management entities (LMEs), and similarly setting the value of layer-specific parameters. SME (1430) would typically perform such functions on behalf of general system management entities and would implement standard management protocols.

The various entities within FIG. 17 interact in various ways. FIG. 17 shows some examples of exchanging GET/SET primitives. XX-GET.request primitive is used for requesting the value of the given MIBattribute (management information base attribute). XX-GET.confirm primitive is used for returning the appropriate MIB attribute value if status="success," otherwise returning an error indication in the Status field. XX-SET.request primitive is used for requesting that the indicated MIB attribute be set to the given value. If this MIB attribute implies a specific action, then this requests that the action be performed. And, XX-SET.confirm primitive is used such that, if status="success," this confirms that the indicated MIB attribute was set to the requested value, otherwise it returns an error condition in status field. If this MIB attribute implies a specific action, then this confirms that the action was performed.

As shown in FIG. 17, MLME (1411) and SME (1430) may exchange various MLME_GET/SET primitives via MLME_SAP (1450). According to one example of the present invention, SME (1430) may transmit MLME_WSM.request primitive to MLME (1411) for requesting MLME (1411) to transmit the White Space Map Announcement Frame to another STA. In other case, MLME (1411) may transmit MLME-WSM.indication primitive to SME (1430) to indicate the reception of the White Space Map Announcement Frame from another STA.

Also, as shown in FIG. 14, various PLCM_GET/SET primitives may be exchanged between PLME (1421) and SME (1430) via PLME_SAP (1460), and between MLME (1411) and PLME (1470) via MLME-PLME_SAP (1470).

WSM element of one example of the present invention can be transmitted by the sequential procedures of MAC (1410) and PHY (1420). Also, WSM element of one example of the present invention can be received by the sequential procedures of PHY (1420) and MAC (1410).

Although the embodiments of the present invention have been disclosed in view of each aspect of the invention, those skilled in the art will appreciate that embodiments of each aspect of the invention can be incorporated. And, there can be advantages not explicitly discussed, since they are obvious from the description for those skilled in the art.

What is claimed is:

1. A method of performing an enablement procedure by a first station in a regulatory domain where an unlicensed device is permitted to operate at a given time in a given geographical area with regard to a licensed device in a wireless local area network (WLAN), the method comprising:

receiving an enabling signal, including a DSE (dynamic station enablement) registered location element with a registered location DSE bit set to "1", from a second station, the enabling signal informing the first station that an enablement is possible, the second station being a dependent AP (access point) station different from an enabling station, the enabling signal comprising a first enablement identifier field indicating an enablement ID allocated by the enabling station to the first station and an identifier of the enabling station other than an identifier of the dependent AP station;

transmitting a DSE (dynamic station enablement) enablement request message to the enabling station; and receiving a DSE enablement response message from the enabling station, wherein the DSE enablement response message includes a second enablement identifier field indicating the enablement ID allocated by the enabling station to the first station.

2. The method of claim 1, wherein:

the DSE enablement request message comprises a first query protocol element for DSE enablement request, the first query protocol element including a first information identification (Info ID);

the DSE enablement response message comprises a second query protocol element for DSE enablement response, the second query protocol element including a second Info ID; and the first Info ID and the second Info ID are set to a value for DSE enablement.

3. The method of claim 1, wherein:

the DSE enablement response message comprises a WSM (White Space Map) element;

the WSM element comprises a channel number field and a maximum power level field;

the channel number field indicates the list of available channels; and the maximum power level field indicates maximum allowed transmission powers of the available channels.

4. The method of claim 1, wherein the enabling signal includes DSE registered location information.

5. An apparatus of performing an enablement procedure in a regulatory domain where an unlicensed device is permitted to operate at a given time in a given geographical area with regard to a licensed device in a wireless local area network (WLAN), the apparatus comprising:

a transceiver configured to:

receive an enabling signal, including a DSE (dynamic station enablement) registered location element with a registered location DSE bit set to "1", from a dependent AP (Access Point) station different from an enabling station;

transmit a DSE (dynamic station enablement) enablement request message to the enabling station; and receive a DSE enablement response message from the enabling station, the DSE enablement response message including a second enablement identifier field indicating an enablement ID allocated by the enabling station to the first station; and a processor configured to process the enabling signal, the DSE enablement request message, and the DSE enablement response message, the enabling signal informing the apparatus that an enablement is possible, the enabling signal comprising a first enablement identifier field indicating the enablement ID allocated by the enabling station to the first station and an identifier of the enabling station other than an identifier of the dependent AP station.

6. The apparatus of claim 5, wherein:

the DSE enablement request message comprises a first query protocol element for DSE enablement request;

the DSE enablement response message comprises a second query protocol element for DSE enablement response;

the second query protocol element includes a second Info ID;

the first query protocol element includes a first information identification (Info ID); and the first Info ID and the second Info ID are set to a value for DSE enablement.

* * * * *